UNITED STATES PATENT OFFICE.

NILS TESTRUP, OF LONDON, ENGLAND, AND THOMAS RIGBY, OF DUMFRIES, SCOTLAND, ASSIGNORS, BY MESNE ASSIGNMENTS, TO WETCARBONIZING LIMITED, OF LONDON, ENGLAND.

PRODUCTION OF WET-CARBONIZED-PEAT BRIQUETS.

1,139,315.  Specification of Letters Patent.  Patented May 11, 1915.

No Drawing.  Application filed May 6, 1912.  Serial No. 695,397.

*To all whom it may concern:*

Be it known that we, NILS TESTRUP, a subject of the King of Great Britain and Ireland, and residing at 6 Broad Street Place, London, E. C., England, and THOMAS RIGBY, a subject of the King of Great Britain and Ireland, and residing at Station Hotel, Dumfries, North Britain, have invented certain new and useful Improvements Relating to the Production of Wet-Carbonized-Peat Briquets, of which the following is a specification.

This invention relates to the production of briquets, from wet carbonized peat, that is peat which has been heated to a temperature between 150 degrees and 250 degrees centigrade under pressure as proposed by Ekenberg.

The object of the present invention is to provide a process which shall allow of effecting a material saving in the cost of producing briquets from such material relatively to the cost of production according to processes previously proposed therefor.

It has always been supposed as a result of Ekenberg's disclosures that it was essential to the production of sound and strong briquets that the material should be absolutely dry (2–3% water content at most according to Ekenberg's British Patent No. 12010 of 1909) before briqueting.

Now we have observed that if the peat is freed from the bulk of its water after carbonization in a filter press followed by subsequent drying by heat extremely compact and strong briquets can be obtained on compression by impact while a substantial amount of water is still contained in the material.

We have also observed that the material when separated from its water as referred to above, has an extremely low specific gravity shown by microscopic examination to be due to the intimate inclusion within the mass of large number of small air passages and cells. The extent of this porosity may be judged from the fact that in one test the specific gravity of the material was 0.27 and after removal of inclosed air 1.4. It appears therefore as if this structure of the peat accounts for the ease with which the material can be briqueted, and of the improved nature of the product the minute channels and interstices formed in and left in the peat by the expression of the liquid in the filter press seemingly becoming filled with air during the subsequent drying operation so that the rapid compression of the air on the impact in the briqueting press raises it to a relatively high temperature thereby fusing (at least superficially) the binders present in the material. Owing, however, to the intimate distribution and amount of the air in the material, the fusion is extremely effective.

To test these assumptions, a batch of wet carbonized peat was divided into two portions, the one of which was free from the bulk of its water in a filter press, and the other free from the bulk of its water by a screw press, and squeezing in the ordinary way, the materials being then dried in a drying oven at about 110 degrees centigrade. Both were now briqueted by impact, the die being in each case heated to the same temperature, and the speed of application of the pressure and the actual pressure being in both cases as nearly alike as possible. The briquets made in this way showed that, whereas those produced from the peat which had been separated from its water by filter pressing, were strong and well bound, those produced from the peat which had been separated from its water by pressing in the ordinary way were relatively weak and crumpled readily, and tests in a testing machine showed relatively crushing strengths of 2 to 1 approximately. Sound strong briquets were made from material containing 5% and upward of water. Briquets were also made from ordinary air dried peat and from wet carbonized peat, which had been separated from its water in a screw press both being thoroughly dried and then briqueted by slow pressure, the die being heated to a temperature of about 110 degrees in each case. The briquet of air dried peat was strong and well bound, while that of wet carbonized peat was brittle and showed no real binding. These tests seemed to show that of the binders occurring naturally in the peat those of fusion temperature less than 110° C. and generally of a bituminous nature are lost in wet carbonizing and that a higher temperature is required to effect binding of wet carbonized peat which can be attained by taking advantage of the porosity of the material in the manner hereinafter indicated. Thus it seems possible in the production of briquets in one or more of several ways, namely, by reducing the amount of drying required, the extent to which the material is heated before briqueting or the power applied in briqueting to utilize this porosity.

This invention consists, therefore, broadly in a briqueting process for wet carbonized peat in which the carbonized material is freed from water in a filter press and drying completed to the desired extent or in which the material is in some other suitable manner given high porosity as indicated and is then by rapid compression briqueted.

In carrying this invention into effect in one form the peat pulp after it leaves the carbonizer is freed from the bulk of its water in a filter press (say down to 68% water content) the resultant cake being then dried in a suitable drier directly or after suitable mechanical pressing in a band or like press. The moisture content may in this way be reduced to 8% or 10% or lower. The material may now be fed directly into the briqueting press which it reaches at a temperature of say 80 degrees centigrade it being unnecessary to superheat the material to 120 degrees centigrade or upward as has been previously requisite for this material.

The press preferably employed is of the open tapered die type. Care should be taken that the taper is not excessive so as to lead to a disturbance of the pressure distribution, it having been observed that if too great a taper be employed a product lacking homogeneity may result. In such a case the product has a brownish hue in parts, as against the black coal like appearance which it possesses when properly briqueted.

Having now described our invention what we claim as new and desire to secure by Letters Patent is:—

1. A process of briqueting peat consisting in heating the same to destroy water binding bodies therein, removing liberated water by filtration under pressure, disintegrating and further drying the material to a low water content and thereupon subjecting the material to consolidation by such suddenly applied pressure as to heat the material to the temperature at which contained binding agents are fused.

2. A process for briqueting peat consisting in rendering the contained water free by heating the peat to a high temperature under pressure, then subjecting the material to filtration under pressure, then to disintegration and further drying to a water content of about 5%, and thereafter to consolidation by such suddenly applied pressure as to raise the temperature of the occluded air and cause fusion of the contained binding substances of high fusion temperature.

3. A process for briqueting peat consisting in rendering the contained water free by heating the peat to a high temperature under pressure, then subjecting the material to filtration under pressure, thereafter to disintegration and further drying to a water content of about 5%, then heating the porous material to a temperature not exceeding 100° C. and thereupon effecting consolidation by a suddenly applied pressure sufficient to heat the material to the temperature at which the contained binding agents are fused.

4. A process for briqueting peat consisting in heating the peat to set free water retained therein, removing liberated water by filtration under pressure, disintegrating and further drying the material to a low water content, heating the material to a temperature not exceeding 100° C. and thereupon consolidating the material by such suddenly applied pressure as to heat the material to the temperature at which contained binding substances are fused.

In testimony whereof we have signed our names to this specification in the presence of two subscribing witnesses.

NILS TESTRUP.
T. RIGBY.

Witnesses:
T. ZACHAN,
BERTRAM H. MATTHEWS.

Copies of this patent may be obtained for five cents each, by addressing the "Commissioner of Patents, Washington, D. C."